US012789575B2

(12) United States Patent
Jeong et al.

(10) Patent No.: US 12,789,575 B2
(45) Date of Patent: Nov. 10, 2026

(54) APPARATUS FOR CONTROLLING VEHICLE AND METHOD THEREOF

(71) Applicants: Hyundai Motor Company, Seoul (KR); Kia Corporation, Seoul (KR); Konkuk University Industrial Cooperation Corp, Seoul (KR)

(72) Inventors: Mu Gwan Jeong, Hwaseong-si (KR); Nam Gyun Kim, Hwaseong-si (KR); Ki Chun Jo, Seoul (KR); Ji Won Seok, Seoul (KR); Seong Jun Kim, Seoul (KR); Jin Su Ha, Seoul (KR); Ji Eun Cho, Seoul (KR); So Yeong Kim, Seoul (KR); Jae Young Jo, Seoul (KR)

(73) Assignees: Hyundai Motor Company, Seoul (KR); Kia Corporation, Seoul (KR); Konkuk University Industrial Cooperation Corp, Seoul (KR)

( * ) Notice: Subject to any disclaimer, the term of this patent is extended or adjusted under 35 U.S.C. 154(b) by 22 days.

(21) Appl. No.: 18/967,142

(22) Filed: Dec. 3, 2024

(65) Prior Publication Data

US 2025/0332879 A1 Oct. 30, 2025

(30) Foreign Application Priority Data

Apr. 24, 2024 (KR) ........................ 10-2024-0054897

(51) Int. Cl.
*B60G 17/018* (2006.01)
*B60G 17/016* (2006.01)
*B60G 17/0165* (2006.01)

(52) U.S. Cl.
CPC ....... *B60G 17/018* (2013.01); *B60G 17/0162* (2013.01); *B60G 17/0165* (2013.01); *B60G 2400/41* (2013.01); *B60G 2400/823* (2013.01)

(58) Field of Classification Search
CPC ............ B60G 17/0162; B60G 17/0165; B60G 17/018; B60G 17/019; B60G 17/142;
(Continued)

(56) References Cited

U.S. PATENT DOCUMENTS 12,280,628 B1 * 4/2025 Zhao .................. B60G 17/0165
12,552,404 B2 * 2/2026 Arar ...................... B60W 50/14
(Continued)

OTHER PUBLICATIONS

Jiwon Seok et al. "LiDAR-based Road Height Profile Estimation and Bump Detection for Preview Suspension (IEEE Transactions on Intelligent Vehicles)".

*Primary Examiner* — Hai H Huynh
*Assistant Examiner* — Johnny H Hoang
(74) *Attorney, Agent, or Firm* — Banner & Witcoff, Ltd.

(57) ABSTRACT

The present disclosure relates to a vehicle control apparatus and a method thereof. The vehicle control apparatus may include a light detection and ranging device (LiDAR), and a processor. The processor may receive, via the LiDAR, a point cloud corresponding to a road surface on which a vehicle is driving, determine, based on a steering sensor of the vehicle, a predicted driving route of the vehicle, determine, based on at least one of the point cloud or the predicted driving route, a profile of the road surface, determine, based on the profile, information about an obstacle on the road surface, and control, based on the information about the obstacle, a suspension of the vehicle.

20 Claims, 9 Drawing Sheets

(58) Field of Classification Search
CPC .......... B60G 2401/142; B60G 2401/21; B60G 2401/174; B60G 2400/82; B60G 2400/821; B60G 2400/823; B60G 2400/41; B60G 2400/252; B60G 2500/30
USPC ................................................ 701/41–92, 37
See application file for complete search history.

(56) References Cited

U.S. PATENT DOCUMENTS

| | | | | |
|---|---|---|---|---|
| 2014/0019008 | A1* | 1/2014 | Nakamura | B62D 6/008<br>701/42 |
| 2014/0195112 | A1* | 7/2014 | Lu | B60G 17/015<br>703/2 |
| 2014/0350836 | A1* | 11/2014 | Stettner | G01S 17/931<br>356/4.01 |
| 2020/0198431 | A1* | 6/2020 | Isshiki | B60G 17/018 |
| 2020/0368629 | A1* | 11/2020 | Moss | A63H 17/21 |
| 2021/0009193 | A1* | 1/2021 | Ooba | B62D 17/00 |
| 2021/0086695 | A1* | 3/2021 | Mahnken | B62D 21/20 |
| 2022/0297494 | A1* | 9/2022 | Konada | B60G 17/0165 |
| 2022/0314725 | A1* | 10/2022 | Kuretake | B60G 17/0195 |
| 2023/0245414 | A1* | 8/2023 | Lewin | G06V 20/56<br>382/100 |
| 2024/0274015 | A1* | 8/2024 | Putney | G08G 1/22 |

* cited by examiner

APPARATUS FOR CONTROLLING VEHICLE AND METHOD THEREOF

CROSS-REFERENCE TO RELATED APPLICATION

This application claims the benefit of priority to Korean Patent Application No. 10-2024-0054897, filed in the Korean Intellectual Property Office on Apr. 24, 2024, the entire contents of which are incorporated herein by reference.

TECHNICAL FIELD

The present disclosure relates to a vehicle control apparatus and a method thereof, and more particularly, relates to a technology for using light detection and ranging (LiDAR).

BACKGROUND

Advancements are being made for improving performance of vehicles being driven in a driving assistance mode or an autonomous driving mode. For these vehicles, it is important to accurately determine the surrounding environments of the vehicles.

In particular, various sensors may be used to identify obstacles located in a driving route of the vehicle. However, various parameters specifications that are specific to various sensor types may reduce the performance of object identification.

For example, if an obstacle is identified using a camera, the influence of surrounding (e.g., ambient) illumination and/or a weather condition may affect the performance of object identification. Accordingly, there is a need for more accurate ways to identify obstacles by using sensors other than the camera, such as a LiDAR.

SUMMARY

The present disclosure was made to solve the above-mentioned problems occurring in at least some implementations while advantages achieved by those implementations are maintained intact.

An aspect of the present disclosure provides a vehicle control apparatus for identifying obstacles by using a LiDAR, and a method thereof.

An aspect of the present disclosure provides a vehicle control apparatus for controlling a suspension of a vehicle by identifying obstacles by using the LiDAR, and a method thereof.

An aspect of the present disclosure provides a vehicle control apparatus for improving the riding comfort of passengers by controlling the suspension of the vehicle according to obstacles, and a method thereof.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, a vehicle control apparatus may include: a light detection and ranging device (LiDAR); and a processor configured to: receive, via the LiDAR, a point cloud corresponding to a road surface on which a vehicle is driving; determine, based on a steering sensor of the vehicle, a predicted driving route of the vehicle; determine, based on at least one of the point cloud or the predicted driving route, a profile of the road surface; determine, based on the profile, information about an obstacle on the road surface; and control, based on the information about the obstacle, a suspension of the vehicle.

The processor may be further configured to: extract, from the point cloud, partial points included in the predicted driving route.

The processor may be configured to determine the profile by: determining projection points by projecting the partial points onto a plain in a coordinate system associated with the point cloud; and determining the profile based on a distance between the predicted driving route and the projection points.

The processor may be further configured to: determine an interpolated profile of the road surface by performing, based on a smoothing spline, interpolation on a portion, of the profile, that is not represented in the point cloud.

The information about the obstacle may include shape information about the obstacle, and wherein the processor is configured to determine the information about the obstacle by: determining, based on at least one of a slope of an interpolated profile of the road surface or one or more extrema of a second derivative curvature of the interpolated profile, the shape information of the obstacle.

The processor may be configured to determine the shape information by: determining the shape information of the obstacle based on an order of signs of the one or more extrema.

The processor may be configured to determine the shape information by one of: determining, based on the order of the signs of the one or more extrema being positive-to-negative-to-positive, that the obstacle is convex relative to a surrounding area of the road surface; or determining, based on the order of the signs of the one or more extrema being negative-to-positive-to-negative, that the obstacle is concave relative to the surrounding area of the road surface.

The processor may be configured to: filter the information about the obstacle based on at least one of symmetricity of the shape information of the obstacle, or parallelism of the road surface.

The vehicle control apparatus may further include a memory storing a neural network model. The processor may be further configured to: obtain, via the steering sensor, steering information associated with the vehicle; and determine, based on applying the steering information to the neural network model, a predicted turn radius of the vehicle.

The processor may be further configured to: determine, based on Ackermann geometry, a turn radius of each wheel of the vehicle.

According to one or more example embodiments of the present disclosure, a method performed by an apparatus of a vehicle may include: receiving, by a processor and via a light detection and ranging device, a point cloud corresponding to a road surface on which the vehicle is driving; determining, based on a steering sensor of the vehicle, a predicted driving route of the vehicle; determining, based on at least one of the point cloud or the predicted driving route, a profile of the road surface; determining, based on the profile, information about an obstacle on the road surface; and controlling, based on the information about the obstacle, a suspension of the vehicle.

The method may further include: extracting, from the point cloud, partial points included in the predicted driving route.

Determining the profile may include: determining projection points by projecting the partial points onto a plain in a coordinate system associated with the point cloud; and determining the profile based on a distance between the predicted driving route and the projection points.

The method may further include: determining an interpolated profile of the road surface by performing, based on a smoothing spline, interpolation on a portion, of the profile, that is not represented in the point cloud.

The information about the obstacle may include shape information about the obstacle. Determining the information about the obstacle may include: determining, based on at least one of a slope of an interpolated profile of the road surface or one or more extrema of a second derivative curvature of the interpolated profile, the shape information of the obstacle.

Determining the shape information may include: determining the shape information of the obstacle based on an order of signs of the one or more extrema.

Determining the shape information may include one of: determining, based on the order of the signs of the one or more extrema being positive-to-negative-to-positive, that the obstacle is convex relative to a surrounding area of the road surface; or determining, based on the order of the signs of the one or more extrema being negative-to-positive-to-negative, that the obstacle is concave relative to the surrounding area of the road surface.

The method may further include: filtering the information about the obstacle based on at least one of symmetricity of the shape information of the obstacle, or parallelism of the road surface.

The method may further include: obtaining, via the steering sensor, steering information associated with the vehicle; and determining, based on applying the steering information to a neural network model, a predicted turn radius of the vehicle.

The method may further include: determining, based on Ackermann geometry, a turn radius of each wheel of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
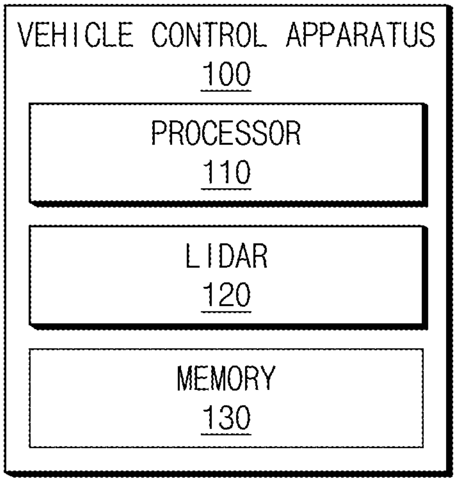
FIG. 1 shows an example of a block diagram associated with a vehicle control apparatus.

Hereinafter, one or more example embodiments of the present disclosure will be described in detail with reference to the accompanying drawings. In adding reference numerals to components of each drawing, it should be noted that the same components include the same reference numerals, although they are indicated on another drawing. Furthermore, in describing the example embodiments of the present disclosure, detailed descriptions associated with well-known functions or configurations will be omitted if they may make subject matters of the present disclosure unnecessarily obscure.

In describing elements of one or more example embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as including a meaning that is consistent with their meaning in the context of the present disclosure and the relevant art and will not be interpreted in an idealized or overly formal sense unless expressly so defined herein.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver when the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein. One or more features associated with autonomous driving control may be activated based on configured autonomous driving control setting(s) (e.g., based on at least one of: an autonomous driving classification, a selection of an autonomous driving level for a vehicle, etc.).

Based on one or more features (e.g., a profile based on point clouds and/or a predicted driving route) described herein, an operation of the vehicle may be controlled. The vehicle control may include various operational controls associated with the vehicle (e.g., autonomous driving control, sensor control, braking control, braking time control, acceleration control, acceleration change rate control, alarm timing control, forward collision warning time control, suspension control, etc.).

One or more auxiliary devices (e.g., engine brake, exhaust brake, hydraulic retarder, electric retarder, regenerative brake, etc.) may also be controlled, for example, based on one or more features (e.g., a profile based on point clouds and/or a predicted driving route) described herein. One or more communication devices (e.g., a modem, a network adapter, a radio transceiver, an antenna, etc., that is capable of communicating via one or more wired or wireless communication protocols, such as Ethernet, Wi-Fi, near-field communication (NFC), Bluetooth, Long-Term Evolution (LTE), 5G New Radio (NR), vehicle-to-everything (V2X), etc.) may also be controlled, for example, based on one or more features (e.g., a profile based on point clouds and/or a predicted driving route) described herein.

Minimum risk maneuver (MRM) operation(s) may also be controlled, for example, based on one or more features (e.g., a profile based on point clouds and/or a predicted driving route) described herein. A minimal risk maneuvering operation (e.g., a minimal risk maneuver, a minimum risk maneuver) may be a maneuvering operation of a vehicle to minimize (e.g., reduce) a risk of collision with surrounding vehicles in order to reach a lowered (e.g., minimum) risk state. A minimal risk maneuver may be an operation that may be activated during autonomous driving of the vehicle when a driver is unable to respond to a request to intervene. During the minimal risk maneuver, one or more processors of the vehicle may control a driving operation of the vehicle for a set period of time.

Biased driving operation(s) may also be controlled, for example, based on one or more features (e.g., a profile based on point clouds and/or a predicted driving route) described herein. A driving control apparatus may perform a biased driving control. To perform a biased driving, the driving control apparatus may control the vehicle to drive in a lane by maintaining a lateral distance between the position of the center of the vehicle and the center of the lane. For example, the driving control apparatus may control the vehicle to stay in the lane but not in the center of the lane.

The driving control apparatus may identify a biased target lateral distance for biased driving control. For example, a biased target lateral distance may comprise an intentionally adjusted lateral distance that a vehicle may aim to maintain from a reference point, such as the center of a lane or another vehicle, during maneuvers such as lane changes. This adjustment may be made to improve the vehicle's stability, safety, and/or performance under varying driving conditions, etc. For example, during a lane change, the driving control system may bias the lateral distance to keep a safer gap from adjacent vehicles, considering factors such as the vehicle's speed, road conditions, and/or the presence of obstacles, etc.

One or more sensors (e.g., IMU sensors, camera, LIDAR, RADAR, blind spot monitoring sensor, line departure warning sensor, parking sensor, light sensor, rain sensor, traction control sensor, anti-lock braking system sensor, tire pressure monitoring sensor, seatbelt sensor, airbag sensor, fuel sensor, emission sensor, throttle position sensor, inverter, converter, motor controller, power distribution unit, high-voltage wiring and connectors, auxiliary power modules, charging interface, etc.) may also be controlled, for example, based on one or more features (e.g., a profile based on point clouds and/or a predicted driving route) described herein.

An operation control for autonomous driving of the vehicle may include various driving control of the vehicle by the vehicle control device (e.g., acceleration, deceleration, steering control, gear shifting control, braking system control, traction control, stability control, cruise control, lane keeping assist control, collision avoidance system control, emergency brake assistance control, traffic sign recognition control, adaptive headlight control, suspension control, etc.).

Hereinafter, one or more example embodiments of the present disclosure will be described in detail with reference to FIGS. 1 to 9.

FIG. 1 shows an example of a block diagram associated with a vehicle control apparatus.

Referring to FIG. 1, a vehicle control apparatus 100 may be implemented inside or outside a vehicle, and some of components included in the vehicle control apparatus 100 may be implemented inside or outside the vehicle. At this time, the vehicle control apparatus 100 may be integrated with internal control units of a vehicle and may be implemented with a separate device so as to be coupled with control units of the vehicle by means of a separate connection means. For example, the vehicle control apparatus 100 may further include components not shown in FIG. 1.

The vehicle control apparatus 100 may include a processor 110 and a LiDAR 120. The vehicle control apparatus 100 may further include a memory 130. The processor 110, the LiDAR 120, or the memory 130 may be electronically and/or operably coupled with each other by an electronical component including a communication bus.

Hereinafter, the fact that pieces of hardware are coupled operably may include the fact that a direct and/or indirect connection between the pieces of hardware is established by wired and/or wirelessly such that second hardware is controlled by first hardware among the pieces of hardware.

Although different blocks are shown, the present disclosure is not limited thereto. For example, some of the pieces of hardware in FIG. 1 may be included in a single integrated circuit including a system on chip (SoC).

The type and/or number of hardware included in the vehicle control apparatus 100 is not limited to that shown in FIG. 1. For example, the vehicle control apparatus 100 may include only some of the pieces of hardware shown in FIG. 1.

The vehicle control apparatus 100 may include hardware for processing data based on one or more instructions. For example, the hardware for processing data may include the processor 110.

For example, the hardware for processing data may include an arithmetic and logic unit (ALU), a floating-point unit (FPU), a field programmable gate array (FPGA), a central processing unit (CPU), and/or an application processor (AP). The processor 110 may include a structure of a single-core processor, or may include a structure of a multi-core processor including a dual core, a quad core, a hexa core, or an octa core.

The vehicle control apparatus 100 may include the LiDAR 120. For example, the LiDAR 120 may obtain data sets obtained by identifying objects surrounding the vehicle control apparatus 100 (or a vehicle including the vehicle control apparatus 100). For example, the LiDAR 120 may identify at least one of a location of the surrounding object, a movement direction of the surrounding object, or the speed of the surrounding object, or any combination thereof based on a pulse laser signal emitted from the LiDAR 120 being reflected and returned by the surrounding object.

For example, the LiDAR 120 may obtain data sets for expressing an external object in the space defined by an x-axis, a y-axis, and a z-axis based on a pulse laser signal reflected from surrounding objects. For example, the LiDAR 120 may obtain data sets including a plurality of points in the space, which is formed by the x-axis, the y-axis, and the z-axis, based on receiving the pulse laser signal at a designated period.

The memory 130 of the vehicle control apparatus 100 may include a hardware component for storing data and/or instructions that are to be input and/or output to the processor 110 of the vehicle control apparatus 100.

For example, the memory 130 may include a volatile memory including a random-access memory (RAM), or a non-volatile memory including a read-only memory (ROM).

For example, the volatile memory may include at least one of a dynamic RAM (DRAM), a static RAM (SRAM), a cache RAM, or a pseudo SRAM (PSRAM), or any combination thereof.

For example, the non-volatile memory includes at least one of a programmable ROM (PROM), an erasable PROM (EPROM), an electrically erasable PROM (EEPROM), a flash memory, a hard disk, a compact disk, a solid-state drive (SSD), or an embedded multi-media card (eMMC), or any combination thereof.

The processor 110 may obtain a point cloud corresponding to a road surface, on which a vehicle is driving, through the LiDAR 120. For example, while obtaining a point cloud corresponding to the road surface, on which the vehicle is driving, through the LiDAR, the processor 110 may predict a driving route of the vehicle through a steering sensor included in the vehicle.

For example, while obtaining a point cloud corresponding to the road surface, on which the vehicle is driving, through the LiDAR 120, the processor 110 may generate a profile (e.g., a profile of the road surface) by using at least one of a point cloud, or a predicted driving route, or any combination thereof based on predicting the driving route of the vehicle through a steering sensor included in the vehicle. The profile may be a height profile that indicates height (e.g., relative height) information of one or more points on the road surface.

For example, the processor 110 may input steering information obtained through the steering sensor to a neural network model stored in the memory 130. The processor 110 may predict the turn radius of the vehicle based on applying the steering information obtained through the steering sensor to the neural network model.

For example, the processor 110 may calculate the turn radius of each wheel included in the vehicle based on Ackermann geometry.

For example, the processor may predict the driving route of the vehicle based on the turn radius of the vehicle, and/or the turn radius of each wheel included in the vehicle.

The processor 110 may obtain road surface obstacle information from a profile based on applying a designated algorithm to the profile.

For example, the designated algorithm may include at least one of profile smoothing, or profile second derivative extrema detection, or any combination thereof.

For example, the processor 110 may extract partial points included in the predicted driving route from the point cloud.

For example, the processor 110 may obtain projection points by projecting the partial points onto a designated face (e.g., surface, plain, etc.) of the coordinate system, in which the point cloud is expressed, based on extracting the partial points.

For example, the processor 110 may create a profile based on a distance between projection points and the predicted driving route. For example, the predicted driving route may include movement routes of wheels included in the vehicle.

For example, the processor 110 may perform interpolation (e.g., a smoothing spline) on a portion, where at least part of the point cloud is not present in the profile. In other words, the processor 110 may perform interpolation (e.g., a smoothing spline) on a part of the profile where there exists a missing portion (e.g., a gap) in the point cloud (e.g., the part of the profile is not represented in the point cloud).

For example, the processor 110 may obtain an interpolated profile, which is obtained by performing interpolation on the portion, based on performing a smoothing spline on the portion, where at least part of the point cloud is not present in the profile (e.g., the profile of the road surface).

For example, the processor 110 may identify at least one of a slope of the interpolated profile (e.g., the interpolated profile of the road surface), or an extremum (e.g., a local maximum or a local minimum) of a second derivative curvature of the interpolated profile, or any combination thereof. For example, the processor 110 may obtain shape information of a road surface obstacle by using at least one of the slope of the interpolated profile, or the extremum (e.g., a local maximum or a local minimum) of the second derivative curvature of the interpolated profile, or any combination thereof. The processor 110 may obtain the road surface obstacle information based on obtaining the shape information of a road surface obstacle by using at least one of the slope of the interpolated profile, or the extremum (e.g., a local maximum or a local minimum) of the second derivative curvature of the interpolated profile, or any combination thereof.

For example, the processor 110 may obtain the shape information of the road surface obstacle based on the order in which signs of extrema (e.g., local maxima or local minima) of the second derivative curvature are sequentially identified.

For example, the processor 110 may identify that the road surface obstacle includes a shape, which protrudes from the road surface (e.g., convex relative to the road surface), based on the signs of extrema of the second derivative curvature being identified in the order of a positive sign, a negative sign, and a positive sign (e.g., positive-to-negative-to-positive). The road surface obstacle may be a portion of the road surface that protrudes from a surrounding area of the road surface (e.g., convex relative to the surrounding area of the road surface).

For example, the processor 110 may identify that the road surface obstacle includes a shape, which sinks into the road surface (e.g., concave relative to the road surface), based on the signs of extrema being identified in the order of a negative sign, a positive sign, and a negative sign (e.g., negative-to-positive-to-negative). The road surface obstacle may be a portion of the road surface that sinks further into the ground (e.g., convex relative to a surrounding area of the road surface).

For example, the processor 110 may filter road surface obstacle information based on at least one of symmetricity of shape information of the road surface obstacle, or parallelism of the road surface of the driving route, or any combination thereof.

The processor 110 may control the suspension of the vehicle based on the road surface obstacle information.

For example, the processor 110 may identify the height of the road surface based on the road surface obstacle information and may control the suspension of the vehicle based on the identified height of the road surface.

As described above, the vehicle control apparatus 100 may control the suspension of the vehicle based on at least one of whether there is a road surface obstacle, a length of the road surface obstacle, a height of the road surface obstacle, or a distance between the vehicle and the road surface obstacle, or any combination thereof, thereby enhancing user experience. Furthermore, the vehicle control apparatus 100 may control the suspension of the vehicle based on at least one of whether there is a road surface obstacle, a length of the road surface obstacle, a height of the road surface obstacle, or a distance between the vehicle and the road surface obstacle, or any combination thereof, thereby increasing the driving stability of the vehicle.

Figure 2:
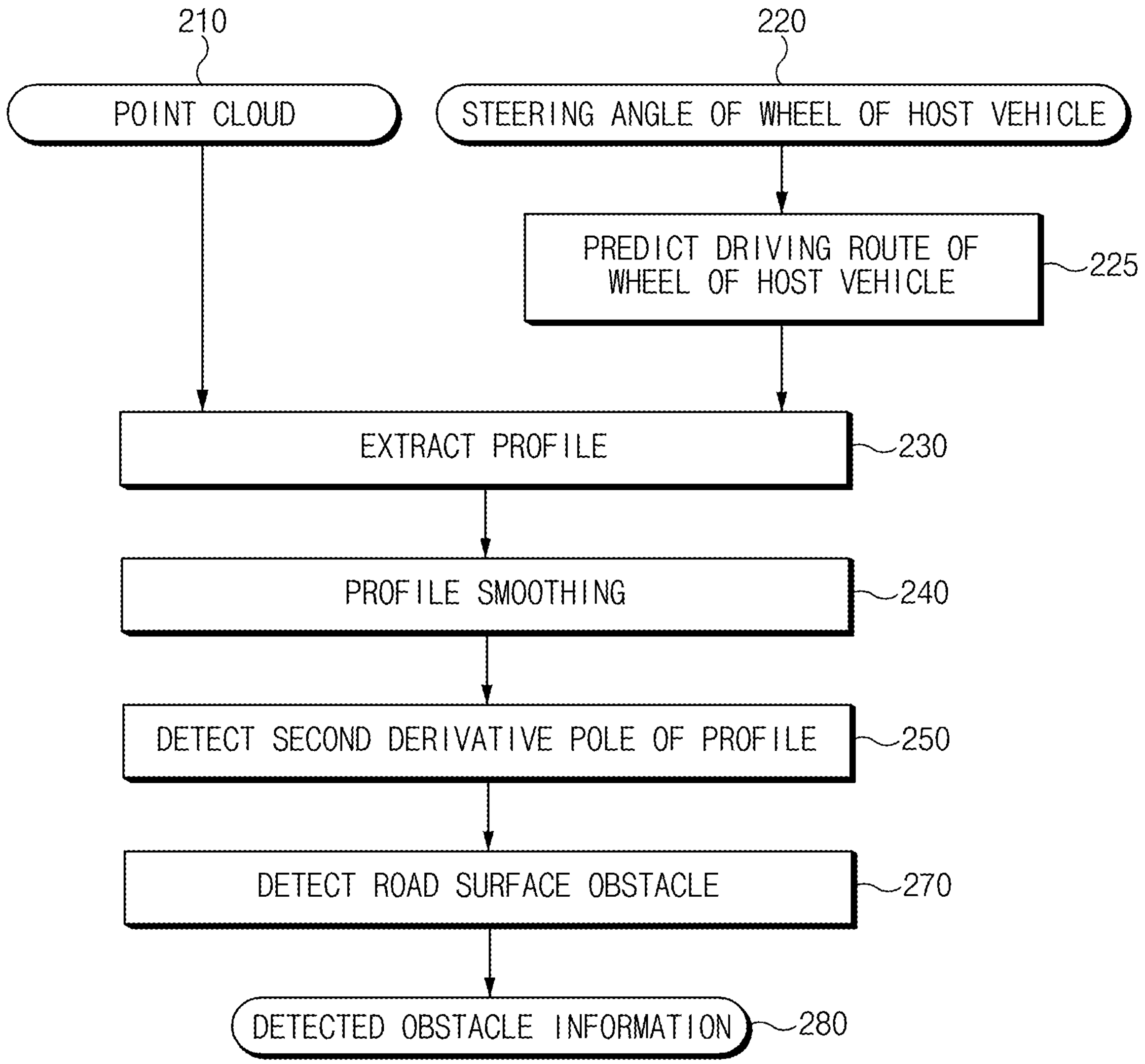
FIG. 2 shows an example of detecting road surface obstacle information.

FIG. 2 shows an example of detecting road surface obstacle information.

Referring to FIG. 2, a processor (e.g., the processor 110 in FIG. 1) of a vehicle control apparatus (e.g., the vehicle control apparatus 100 in FIG. 1) may obtain a point cloud 210 and/or a steering angle 220 of a wheel of a vehicle.

For example, the processor may predict a driving route of the wheel of the vehicle based on the steering angle 220 of the wheel of the vehicle (225).

For example, the processor may predict the driving route of the vehicle's wheels based on a bicycle model and Ackermann geometry.

For example, the processor may predict a trajectory (or a turn radius) of the vehicle by using the wheelbase and/or steering information of the vehicle through the bicycle model.

For example, the processor may calculate the turn radius of each wheel included in the vehicle by using Ackermann geometry for calculating the steering angle of the vehicle.

The processor may extract a point, which is present in the expected driving route of the wheels of the vehicle, from the point cloud 210.

For example, the processor may extract a road surface height profile through the projection of the point cloud of the expected driving route of the wheels of the vehicle (230).

The processor may perform profile smoothing 240.

For example, the processor may perform denoising and interpolation on the profile by using a smoothing spline. For example, cubic and/or quintic equations may be applied to the smoothing spline.

For example, the smoothing spline may include a spline, in which a cumulative value of a second derivative corresponding to the roughness of the spline is minimized while data and a residual value are minimized by adding a penalty term for the roughness to the objective function of a regression spline.

The processor may detect a second derivative extremum of the profile (250).

For example, the processor may identify a point at which the slope of the smoothed profile changes. The processor may identify the extremum of a second derivative value of a profile at the point where the slope of the smoothed profile changes.

For example, the processor may calculate the second derivative value of the profile by applying a central difference method to the smoothed profile and may split a section at each point where the sign of the second derivative value changes. The processor may detect points with the second derivative value, which is greatest, as extrema within each split section The processor may detect a road surface obstacle (270).

For example, the processor may detect an obstacle protruding from a road surface (or ground). For example, the processor may detect the obstacle protruding from the road surface based on identifying the second derivative extremum of a positive sign appears at the start and end points of the split section and the second derivative value of the negative sign in the central portion of the split section.

For example, the processor may detect an obstacle sunken into the road surface. For example, the processor may detect the obstacle sunken into the road surface based on identifying the second derivative extremum of a negative sign appears at the start and end points of the split section and the second derivative value of the positive sign in the central portion of the split section.

The processor may obtain the detected obstacle information (280). For example, the detected obstacle information 280 may include information indicating a road surface obstacle detected by the detection of the road surface obstacle 270.

For example, the processor may control the suspension of the vehicle by using the detected obstacle information (280). For example, the detected obstacle information 280 may include at least one of a distance between the vehicle and an obstacle, the length of the obstacle, or the height of the obstacle, or any combination thereof.

Figure 3:
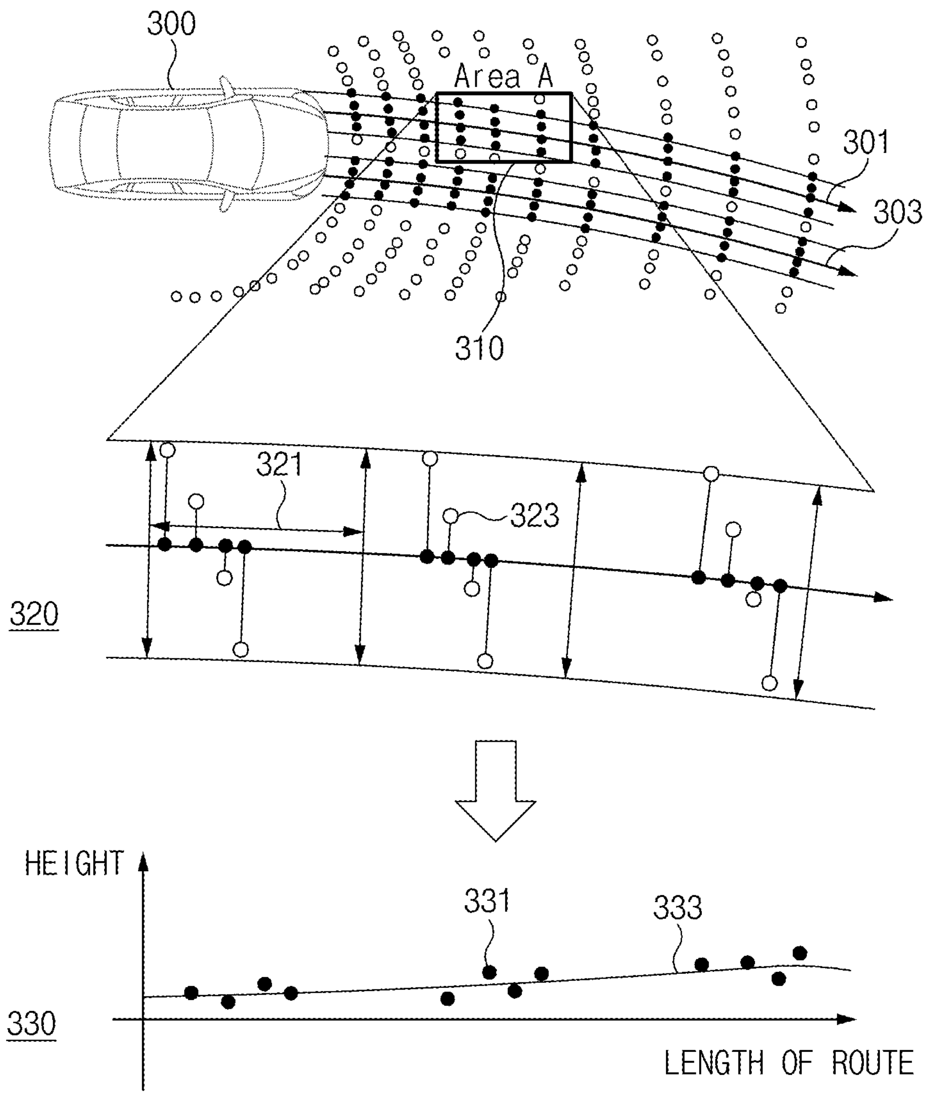
FIG. 3 shows an example of obtaining a profile.

FIG. 3 shows an example of obtaining a profile.

Referring to FIG. 3, a processor (e.g., the processor 110 of FIG. 1) of a vehicle control apparatus (e.g., the vehicle control apparatus 100 of FIG. 1) may predict the driving route of a vehicle 300.

For example, the processor may predict driving routes 301 and 303 respectively corresponding to wheels of the vehicle 300.

For example, the processor may identify a portion 310 of the predicted driving route.

A picture 320 may include an enlarged example of the portion 310 of the predicted driving route.

For example, the processor may identify a point 323 obtained through a LiDAR. For example, the point 323 may include a point corresponding to a road surface.

For example, the processor may project the point 323, which is smaller than or equal to a wheel width of the vehicle, in the portion 310 of the predicted driving route.

For example, the processor may identify at least one of a distance between the vehicle and an obstacle, the height of the obstacle, or the length of the obstacle, or any combination thereof by using a section obtained by splitting a designated distance 321.

The processor may obtain a road surface height profile 330 by using the picture 320.

For example, a horizontal axis of the profile 330 may indicate a length of a route. For example, a vertical axis of the profile 330 may indicate a height.

For example, in the profile 330, a dotted line 333 may be a line indicating an actual road surface. For example, in the profile 330, a point 331 may include a projected point.

Figure 4:
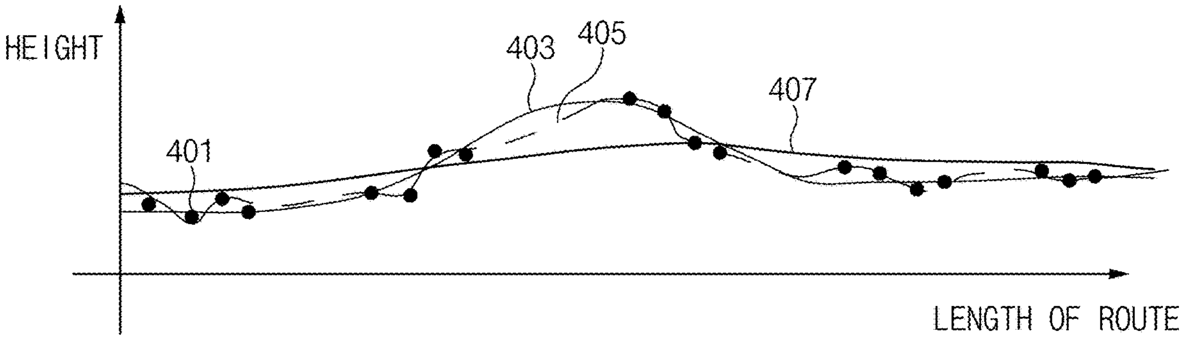
FIG. 4 shows an example of performing smoothing on a profile.

FIG. 4 shows an example of performing smoothing on a profile.

Referring to FIG. 4, a processor (e.g., the processor 110 of FIG. 1) of a vehicle control apparatus (e.g., the vehicle control apparatus 100 of FIG. 1) may perform smoothing on a profile. For example, the processor may perform a smoothing spline on the profile.

For example, the smoothing spline may include an algorithm, which fits a curve with a section-specific polynomial for given data, as an example of a curve fitting method.

In the profile of FIG. 4, a point 401 may include a projected point. In the profile of FIG. 4, a dotted line 403 may include a line indicating an actual road surface. In the profile of FIG. 4, a first solid line 405 may include an over-fitted spline. In the profile of FIG. 4, a second solid line 407 may include an under-fitted spline.

For example, spline and data may satisfy Equation 1.

$$J_{spline} = (1 - \lambda_{smooth})J_{error} + \lambda_{smooth}J_{smooth} \quad \text{[Equation 1]}$$

For example, the smoothing spline may include a method for searching for a cost-based optimal spline. In Equation 1, $J_{error}$ and $J_{smooth}$ may be used as the sum of two costs.

For example, $J_{error}$ may include the sum of errors between the spline and all pieces of data. For example, $J_{smooth}$ may include the sum of curvature of the generated spline. For example, $\lambda_{smooth}$ may be a smoothing factor and may include a mutual weight between the two costs. For example, if $\lambda_{smooth}$ is 0.5, the two costs may act as the same weights as each other.

The processor may estimate a shape of the road surface by performing the above-described algorithm.

Figure 5:
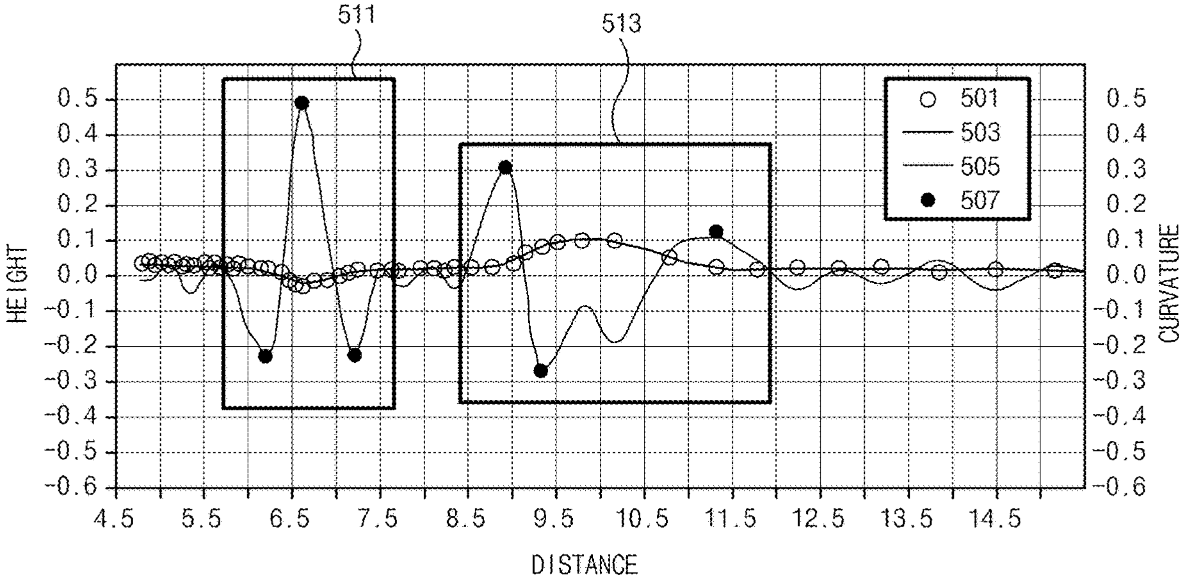
FIG. 5 shows an example of detecting a second derivative extremum of a profile.

FIG. 5 shows an example of detecting a second derivative extremum of a profile.

Referring to FIG. 5, a processor (e.g., the processor 110 in FIG. 1) of a vehicle control apparatus (e.g., the vehicle control apparatus 100 of FIG. 1) may identify a first point 501, a first line 503, a second line 505, and a second point 507 in a profile.

For example, the first point 501 may include a portion of a point cloud obtained from a road surface. For example, the first line 503 may include a road height profile spline. For example, the second line 505 may include the curvature of a spline. For example, the second point 507 may include an extremum.

The processor may identify at least one of a first section 511, or a second section 513, or any combination thereof in the profile.

For example, the processor may identify the sign of the extremum present in the first section 511.

For example, the processor may determine that the first section 511 is an obstacle sunken into the road surface, based on signs of extrema being identified in the first section 511 in the order of a negative sign, a positive sign, and a negative sign (e.g., negative-to-positive-to-negative).

For example, the processor may identify a sign of an extremum present in the second section 513.

For example, the processor may determine that the second section 513 is an obstacle protruding from the road surface, based on signs of extrema being identified in the second section 513 in the order of a positive sign, a negative sign, and a positive sign (e.g., positive-to-negative-to-positive).

Figure 6:
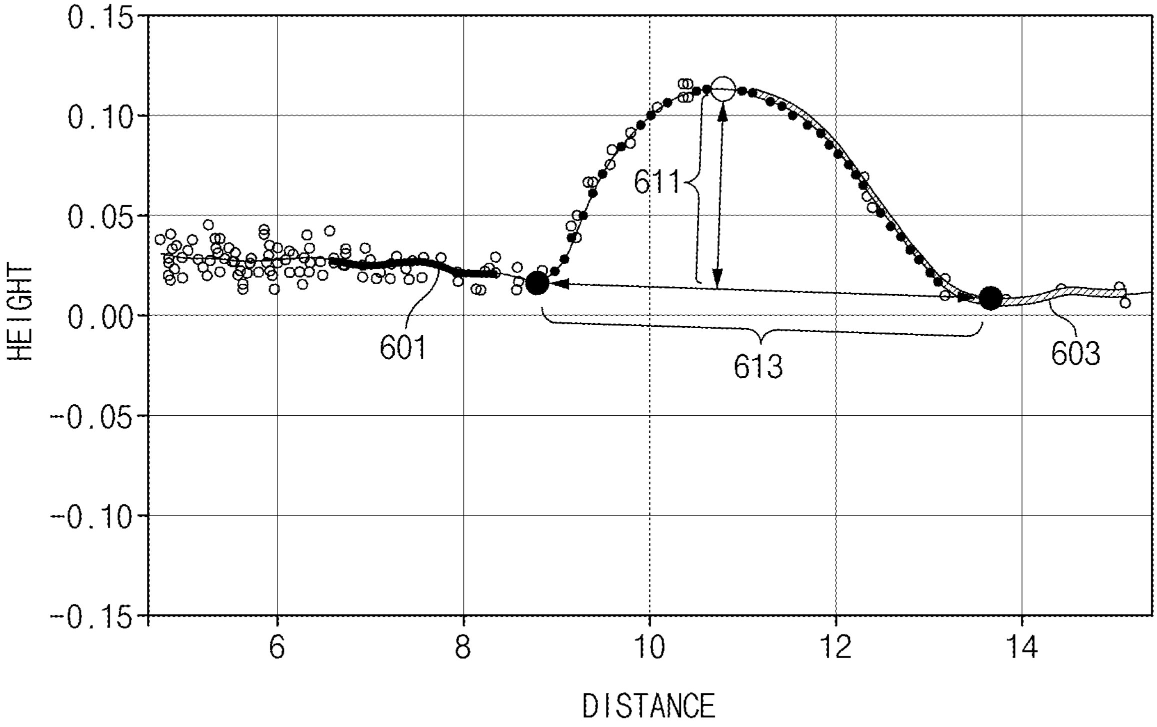
FIG. 6 shows an example of detecting a road surface obstacle.

FIG. 6 shows an example of detecting a road surface obstacle.

Referring to FIG. 6, a processor (e.g., the processor 110 in FIG. 1) of a vehicle control apparatus (e.g., the vehicle control apparatus 100 of FIG. 1) may identify an obstacle in a profile.

For example, the processor may identify a first obstacle 601 in the profile. For example, the first obstacle 601 may be a small obstacle and may not be an actual obstacle. Accordingly, the processor may filter an obstacle, which is not the actual obstacle, such as the first obstacle 601.

For example, the processor may determine whether a section determined as an obstacle is actually an obstacle, by using at least one of a height 611 of the obstacle, or a length 613 of the obstacle, or any combination thereof.

For example, the processor may identify a second obstacle 603. The second obstacle 603 may be an obstacle including a similar shape to that of the first obstacle 601, and may not be an actual obstacle.

In detail, the processor may identify and filter a false obstacle, such as the first obstacle 601 and/or the second obstacle 603 based on at least one of the height 611 of the obstacle, or the length 613 of the obstacle, or any combination thereof being smaller than a reference value.

For example, the processor may identify that the corresponding obstacle is a false obstacle, based on the height 611 of the obstacle being less than a first reference value. For example, the processor may identify that the corresponding obstacle is a false obstacle, based on the length 613 of the obstacle being less than a second reference value.

Figure 7:
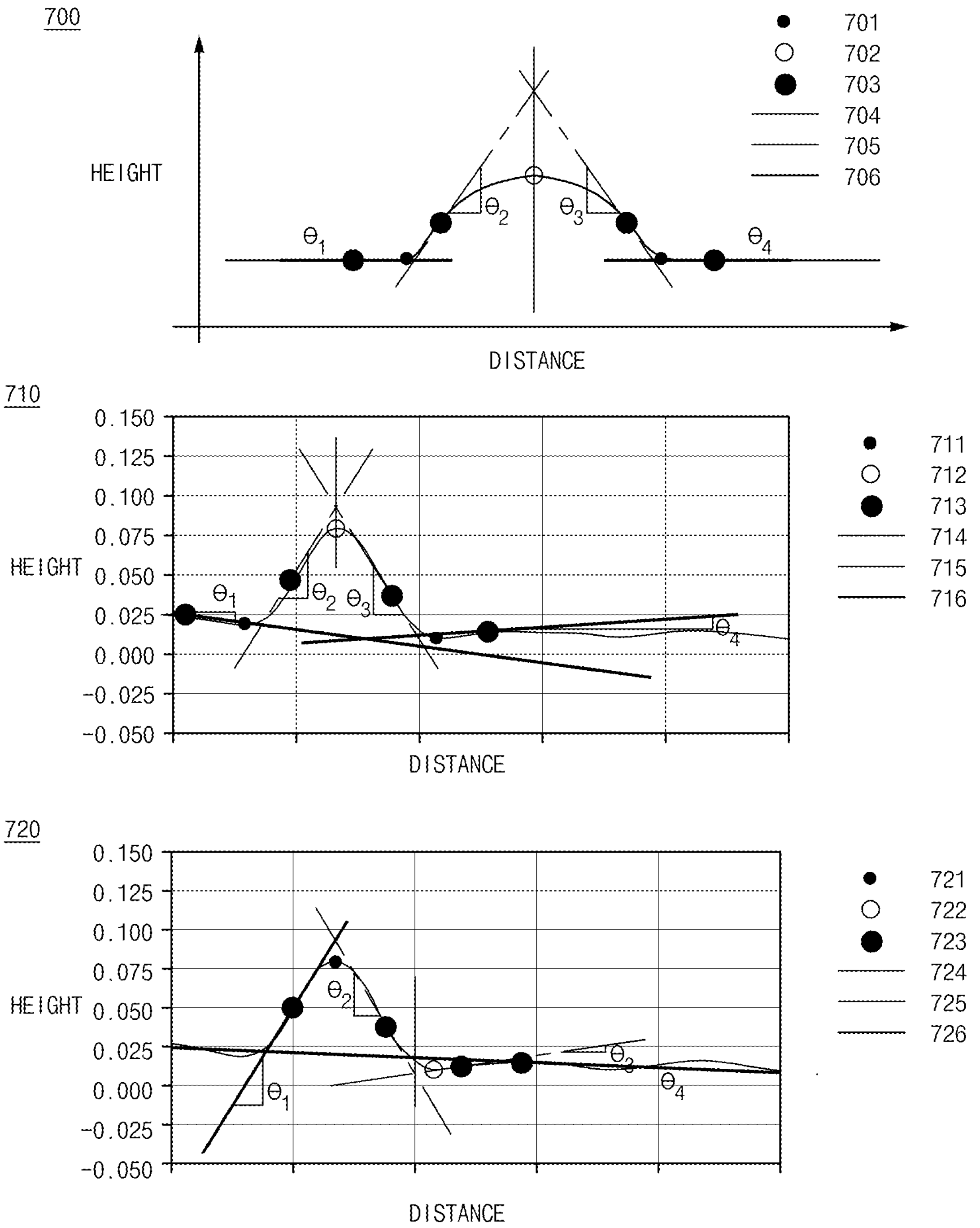
FIG. 7 shows an example of profiles.

FIG. 7 shows an example of profiles.

FIG. 7 shows a first profile 700, a second profile 710, and/or a third profile 720.

For example, the first profile 700 may include an ideal spline and a slope.

For example, the first profile 700 may include at least one of a first point 701, a second point 702, a third point 703, a first line 704, a second line 705, or a third line 706, or any combination thereof.

For example, the first point 701 may include a starting point and/or an ending point. For example, the second point 702 may include a center point. For example, the third point 703 may include the selected point.

For example, the first line 704 may include a tangent line to the ground. For example, the second line 705 may include the tangent line of the obstacle. For example, the third line 706 may include a road height profile spline.

For example, the second profile 710 may include an example where a general obstacle slope with almost symmetricity and the ground is parallel.

For example, the second profile 710 may include at least one of a first point 711, a second point 712, a third point 713, a first line 714, a second line 715, or a third line 716, or any combination thereof.

For example, the first point 711 may include a starting point and/or an ending point. For example, the second point 712 may include a center point. For example, the third point 713 may include the selected point.

For example, the first line 714 may include a tangent line to the ground. For example, the second line 715 may include the tangent line of the obstacle. For example, the third line 716 may include a road height profile spline.

For example, the second profile 720 may include an example where a false obstacle slope without symmetricity and the ground is not parallel.

For example, the third profile 720 may include at least one of a first point 721, a second point 722, a third point 723, a first line 724, a second line 725, or a third line 726, or any combination thereof.

For example, the first point 721 may include a starting point and/or an ending point. For example, the second point 722 may include a center point. For example, the third point 723 may include the selected point.

For example, the first line 724 may include a tangent line to the ground. For example, the second line 725 may include the tangent line of the obstacle. For example, the third line 726 may include a road height profile spline.

For example, the processor may identify symmetricity and/or parallelism based on Equation 2 and/or Equation 3 below.

$$\text{symmetricity} = |\theta_2 + \theta_3| \quad \text{[Equation 2]}$$

$$\text{parallelity} = |\theta_1 - \theta_4| \quad \text{[Equation 3]}$$

For example, the processor may identify the symmetricity by using Equation 2. For example, the processor may identify the parallelism by using Equation 3.

For example, $\theta_1$ may be located before a starting point in a profile and may mean an angle of a tangent of the selected point. For example, $\theta_2$ may be located between the starting point and a center point in the profile, and may mean an angle of the tangent of the selected point. For example, $\theta_3$ may be located between the center point and an ending point and may mean the angle of the tangent of the selected point. For example, $\theta_4$ may be located after the center point and may mean the angle of the tangent of the selected point.

As mentioned above, the processor of the vehicle control apparatus may identify at least one of symmetricity, or parallelism, or any combination thereof based on the angle of the tangent of a point selected in the profile.

The processor may determine whether an obstacle identified in a profile is an actual obstacle or a false obstacle, by identifying at least one of symmetricity, or parallelism, or any combination thereof.

Figure 8:
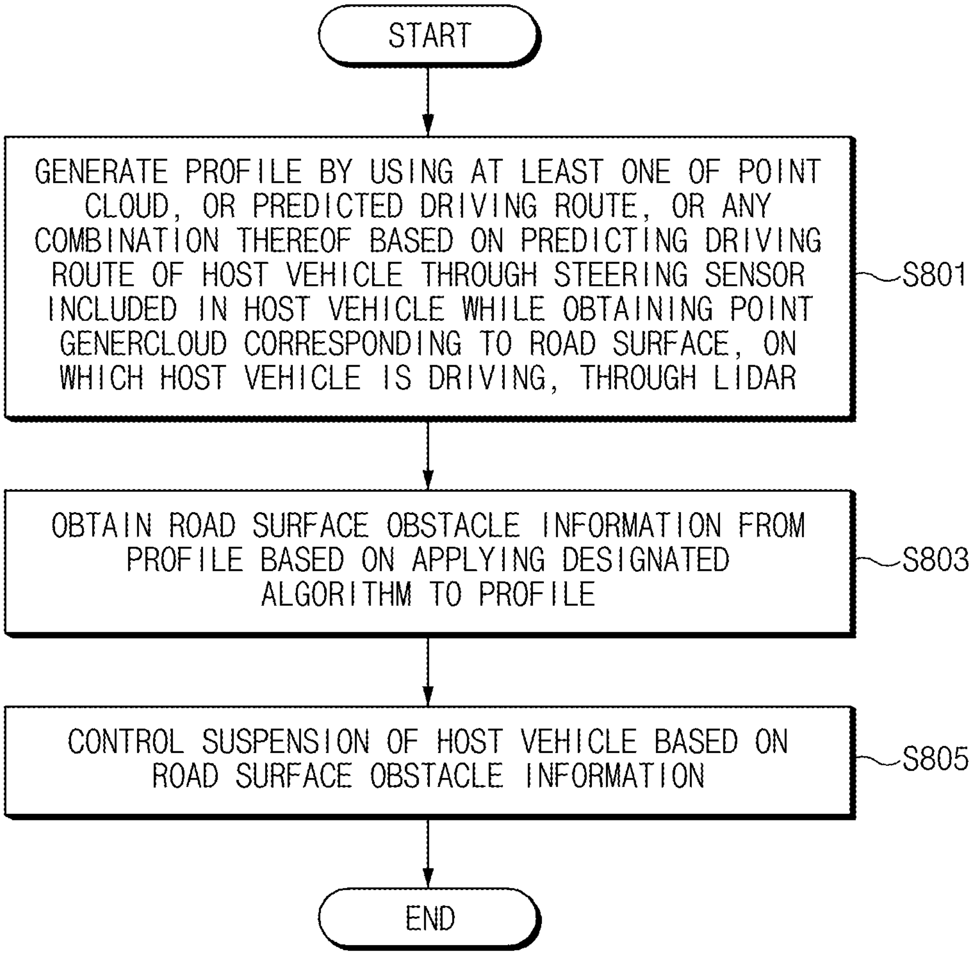
FIG. 8 shows an example of a flowchart associated with a vehicle control method.

FIG. 8 shows an example of a flowchart associated with a vehicle control method.

Hereinafter, it is assumed that the vehicle control apparatus 100 of FIG. 1 performs the process of FIG. 8. In addition, in a description of FIG. 8, it may be understood that an operation described as being performed by an apparatus is controlled by the processor 110 of the vehicle control apparatus 100.

At least one of operations of FIG. 8 may be performed by the vehicle control apparatus 100 of FIG. 1. At least one of operations of FIG. 8 may be performed by the processor 110 of FIG. 1. Each of the operations in FIG. 8 may be performed sequentially, but is not necessarily sequentially performed. For example, the order of operations may be changed, and at least two operations may be performed in parallel.

Referring to FIG. 8, in S801, the vehicle control method may include an operation of generating a profile by using at least one of a point cloud, or a predicted driving route, or any combination thereof based on predicting the driving route of a vehicle through a steering sensor included in the vehicle while obtaining a point cloud corresponding to the road surface, on which the vehicle is driving, through a LiDAR.

For example, the vehicle control method may include an operation of predicting a turn radius of the vehicle based on inputting (e.g., applying) steering information obtained through the steering sensor into a neural network model stored in a memory. For example, the turn radius of the vehicle may include the turn radius of each wheel included in the vehicle.

For example, the vehicle control method may include an operation of calculating a turn radius of each wheel included in the vehicle based on Ackermann geometry.

For example, the vehicle control method may include an operation of extracting partial points included in the predicted driving route from the point cloud.

For example, the vehicle control method may include an operation of obtaining projection points by projecting the partial points onto a designated face (e.g., surface, plain, etc.) of the coordinate system, in which the point cloud is expressed (e.g., the coordinate system used by the point cloud, the coordinated system associated with the point cloud, etc.), based on extracting the partial points.

For example, the vehicle control method may include an operation of creating a profile based on a distance between projection points and the predicted driving route.

For example, the vehicle control method may include an operation of obtaining an interpolated profile, which is obtained by performing interpolation on a portion, based on performing a smoothing spline on the portion, where at least part of the point cloud is not present in the profile.

In S803, the vehicle control method may include an operation of obtaining road surface obstacle information from a profile based on applying a designated algorithm to the profile.

For example, the vehicle control method may include an operation of obtaining the information about the road surface obstacle based on obtaining shape information of the road surface obstacle by using at least one of a slope of the tangent of the selected point included in an interpolated profile, or an extremum of a second derivative curvature, or any combination thereof.

For example, the vehicle control method may include an operation of obtaining the shape information of the road surface obstacle based on an order in which a sign of the extremum is sequentially identified.

For example, the vehicle control method may include an operation of identifying that the road surface obstacle includes a shape, which protrudes from the road surface (e.g., convex relative to the road surface), based on the signs of extrema being identified in the order of a positive sign, a negative sign, and a positive sign (e.g., positive-to-negative-to-positive).

For example, the vehicle control method may include an operation of identifying that the road surface obstacle includes a shape, which sinks into the road surface (e.g., concave relative to the road surface), based on the signs of extrema being identified in the order of a negative sign, a positive sign, and a negative sign (e.g., negative-to-positive-to-negative).

For example, the vehicle control method may include an operation of filtering the information about the road surface obstacle based on at least one of symmetricity of the shape information of the road surface obstacle, or parallelism of a road surface of the driving route, or any combination thereof.

For example, the vehicle control method may include an operation of not outputting the filtered road surface obstacle information based on filtering the road surface obstacle information.

In S805, the vehicle control method may include an operation of controlling the suspension of the vehicle based on the road surface obstacle information.

For example, the vehicle control method may include an operation of identifying at least one of whether there is a road surface obstacle, a length of the road surface obstacle, a height of the road surface obstacle, or a distance between the vehicle and the road surface obstacle, or any combination thereof based on the road surface obstacle information. The vehicle control method may include an operation of controlling the suspension of the vehicle depending on at least one of whether there is a road surface obstacle, a length of the road surface obstacle, a height of the road surface obstacle, or a distance between the vehicle and the road surface obstacle, or any combination thereof.

As described above, the vehicle control method may control the suspension of the vehicle based on at least one of whether there is a road surface obstacle, a length of the road surface obstacle, a height of the road surface obstacle, or a distance between the vehicle and the road surface obstacle, or any combination thereof, thereby enhancing user experience. Furthermore, the vehicle control method may control the suspension of the vehicle based on at least one of whether there is a road surface obstacle, a length of the road surface obstacle, a height of the road surface obstacle, or a distance between the vehicle and the road surface obstacle, or any combination thereof, thereby increasing the driving stability of the vehicle.

Figure 9:
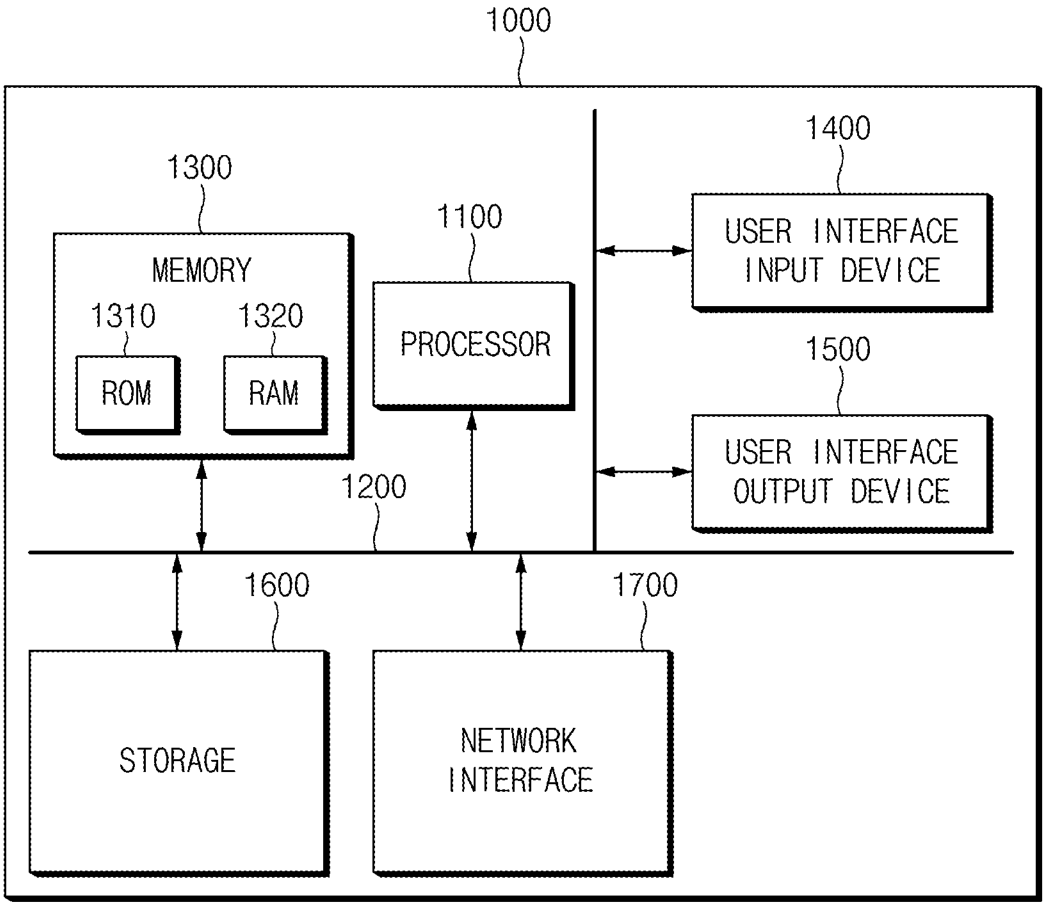
FIG. 9 shows a computing system associated with a vehicle control apparatus or vehicle control method.

FIG. 9 shows a computing system associated with a vehicle control apparatus or vehicle control method.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

According to an aspect of the present disclosure, a vehicle control apparatus may include a light detection and ranging (LiDAR), and a processor. The processor may generate a profile by using at least one of a point cloud, or a predicted driving route, or any combination thereof based on predicting the driving route of a vehicle through a steering sensor included in the vehicle while obtaining the point cloud corresponding to a road surface, on which the vehicle is driving, through the LiDAR, may obtain information about a road surface obstacle from the profile based on applying a designated algorithm to the profile, and may control a suspension of the vehicle based on the information about the road surface obstacle.

In an embodiment, the processor may extract partial points included in the predicted driving route from the point cloud.

In an embodiment, the processor may obtain projection points by projecting the partial points onto a designated face of a coordinate system, in which the point cloud is expressed, based on extracting the partial points, and may generate the profile based on a distance between the predicted driving route and the projection points.

In an embodiment, the processor may obtain an interpolation profile, which is obtained by performing interpolation on a portion, based on performing smoothing spline on the portion, where at least part of the point cloud is not present in the profile.

In an embodiment, the processor may obtain the information about the road surface obstacle based on obtaining shape information of the road surface obstacle by using at least one of a slope of the interpolation profile, or a pole of curvature, or any combination thereof.

In an embodiment, the processor may obtain the shape information of the road surface obstacle based on an order in which a sign of the pole is sequentially identified.

In an embodiment, the processor may identify that the road surface obstacle includes a shape, which protrudes from the road surface, based on the sign of the pole being identified in an order of a positive sign, a negative sign, and a positive sign, and may identify that the road surface obstacle includes a shape, which is sunken into the road surface, based on the sign of the pole being identified in an order of a negative sign, a positive sign, and a negative sign.

In an embodiment, the processor may filter the information about the road surface obstacle based on at least one of symmetricity of the shape information of the road surface obstacle, or parallelism of a road surface of the driving route, or any combination thereof.

The vehicle control apparatus according to an embodiment may further include a memory in which a neural network model is stored. The processor may predict a turning radius of the vehicle based on inputting steering information obtained through the steering sensor into the neural network model.

In an embodiment, the processor may calculate a turning radius of each wheel included in the vehicle based on Ackermann geometry.

According to an aspect of the present disclosure, generating, by a processor, a profile by using at least one of a point cloud, or a predicted driving route, or any combination thereof based on predicting the driving route of a vehicle through a steering sensor included in the vehicle while obtaining the point cloud corresponding to a road surface, on which the vehicle is driving, through a LiDAR, obtaining information about a road surface obstacle from the profile based on applying a designated algorithm to the profile, and controlling a suspension of the vehicle based on the information about the road surface obstacle.

The vehicle control method according to an embodiment may include extracting partial points included in the predicted driving route from the point cloud.

The vehicle control method according to an embodiment may include obtaining projection points by projecting the partial points onto a designated face of a coordinate system, in which the point cloud is expressed, based on extracting the partial points, and generating the profile based on a distance between the predicted driving route and the projection points.

The vehicle control method according to an embodiment may include obtaining an interpolation profile, which is obtained by performing interpolation on a portion, based on performing smoothing spline on the portion, where at least part of the point cloud is not present in the profile.

The vehicle control method according to an embodiment may include obtaining the information about the road surface obstacle based on obtaining shape information of the road surface obstacle by using at least one of a slope of the interpolation profile, or a pole of curvature, or any combination thereof.

The vehicle control method according to an embodiment may include obtaining the shape information of the road surface obstacle based on an order in which a sign of the pole is sequentially identified.

The vehicle control method according to an embodiment may include identifying that the road surface obstacle includes a shape, which protrudes from the road surface, based on the sign of the pole being identified in an order of a positive sign, a negative sign, and a positive sign, and identifying that the road surface obstacle includes a shape, which is sunken into the road surface, based on the sign of the pole being identified in an order of a negative sign, a positive sign, and a negative sign.

The vehicle control method according to an embodiment may include filtering the information about the road surface obstacle based on at least one of symmetricity of the shape information of the road surface obstacle, or parallelism of a road surface of the driving route, or any combination thereof.

The vehicle control method according to an embodiment may include predicting a turning radius of the vehicle based on inputting steering information obtained through the steering sensor into a neural network model stored in a memory.

The vehicle control method according to an embodiment may include calculating a turning radius of each wheel included in the vehicle based on Ackermann geometry.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The above description is merely an example of the technical idea of the present disclosure, and various modifications and modifications may be made by one skilled in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

The present technology may identify obstacles by using a LiDAR.

Moreover, the present technology may control a suspension of a vehicle by identifying obstacles by using the LiDAR.

Furthermore, the present technology may improve the riding comfort of passengers by controlling the suspension of the vehicle according to obstacles.

Besides, a variety of effects directly or indirectly understood through the present disclosure may be provided.

Hereinabove, although the present disclosure was described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle control apparatus comprising:

a light detection and ranging device (LiDAR); and a processor configured to:

receive, via the LiDAR, a point cloud corresponding to a road surface on which a vehicle is driving;

determine, based on a steering sensor of the vehicle, a predicted driving route of the vehicle;

extract, from the point cloud, partial points included in the predicted driving route;

determine projection points by projecting the partial points onto a plain in a coordinate system associated with the point cloud;

determine, based on a distance between the predicted driving route and the projection points, a profile of the road surface;

determine, based on the profile, information about an obstacle on the road surface; and control, based on the information about the obstacle, a suspension of the vehicle.

2. The vehicle control apparatus of claim 1, wherein the processor is further configured to:

determine an interpolated profile of the road surface by performing, based on a smoothing spline, interpolation on a portion, of the profile, that is not represented in the point cloud.

3. The vehicle control apparatus of claim 1, wherein the information about the obstacle comprises shape information about the obstacle, and wherein the processor is configured to determine the information about the obstacle by:

determining, based on at least one of a slope of an interpolated profile of the road surface or one or more extrema of a second derivative curvature of the interpolated profile, the shape information of the obstacle.

4. The vehicle control apparatus of claim 3, wherein the processor is configured to determine the shape information by:

determining the shape information of the obstacle based on an order of signs of the one or more extrema.

5. The vehicle control apparatus of claim 4, wherein the processor is configured to determine the shape information by one of:

determining, based on the order of the signs of the one or more extrema being positive-to-negative-to-positive, that the obstacle is convex relative to a surrounding area of the road surface; or determining, based on the order of the signs of the one or more extrema being negative-to-positive-to-negative, that the obstacle is concave relative to the surrounding area of the road surface.

6. The vehicle control apparatus of claim 4, wherein the processor is configured to:

filter the information about the obstacle based on at least one of symmetricity of the shape information of the obstacle, or parallelism of the road surface.

7. The vehicle control apparatus of claim 1, further comprising:

a memory storing a neural network model, wherein the processor is further configured to:

obtain, via the steering sensor, steering information associated with the vehicle; and determine, based on applying the steering information to the neural network model, a predicted turn radius of the vehicle.

8. The vehicle control apparatus of claim 1, wherein the processor is further configured to:

determine, based on Ackermann geometry, a turn radius of each wheel of the vehicle.

9. The vehicle control apparatus of claim 1, wherein the processor is further configured to:

identify a false obstacle based on at least one of:

a height of the obstacle being less than a first reference value, or a length of the obstacle being less than a second reference value.

10. A method performed by an apparatus of a vehicle, the method comprising:

receiving, by a processor and via a light detection and ranging device, a point cloud corresponding to a road surface on which the vehicle is driving;

determining, based on a steering sensor of the vehicle, a predicted driving route of the vehicle;

extracting, from the point cloud, partial points included in the predicted driving route;

determining projection points by projecting the partial points onto a plain in a coordinate system associated with the point cloud;

determining, based on a distance between the predicted driving route and the projection points, a profile of the road surface;

determining, based on the profile, information about an obstacle on the road surface; and controlling, based on the information about the obstacle, a suspension of the vehicle.

11. The method of claim 10, further comprising:

determining an interpolated profile of the road surface by performing, based on a smoothing spline, interpolation on a portion, of the profile, that is not represented in the point cloud.

12. The method of claim 10, wherein the information about the obstacle comprises shape information about the obstacle, and wherein the determining of the information about the obstacle comprises:

determining, based on at least one of a slope of an interpolated profile of the road surface or one or more extrema of a second derivative curvature of the interpolated profile, the shape information of the obstacle.

13. The method of claim 12, wherein the determining of the shape information comprises:

determining the shape information of the obstacle based on an order of signs of the one or more extrema.

14. The method of claim 13, wherein the determining of the shape information comprises one of:

determining, based on the order of the signs of the one or more extrema being positive-to-negative-to-positive, that the obstacle is convex relative to a surrounding area of the road surface; or determining, based on the order of the signs of the one or more extrema being negative-to-positive-to-negative, that the obstacle is concave relative to the surrounding area of the road surface.

15. The method of claim 13, further comprising:

filtering the information about the obstacle based on at least one of symmetricity of the shape information of the obstacle, or parallelism of the road surface.

16. The method of claim 10, further comprising:

obtaining, via the steering sensor, steering information associated with the vehicle; and determining, based on applying the steering information to a neural network model, a predicted turn radius of the vehicle.

17. The method of claim 10, further comprising:

determining, based on Ackermann geometry, a turn radius of each wheel of the vehicle.

18. A vehicle control apparatus comprising:

a steering sensor;

a processor; and a memory storing instructions that configure the processor to cause the vehicle control apparatus to:

obtain, via the steering sensor, steering information associated with a vehicle;

determine, based on applying the steering information to a neural network model, a predicted turn radius of the vehicle;

determine, based on the predicted turn radius of the vehicle, a predicted driving route of the vehicle;

determine, based on the predicted driving route, a profile of a road surface associated with the predicted driving route;

determine, based on the profile, information about an obstacle on the road surface; and control, based on the information about the obstacle, a suspension of the vehicle.

19. The vehicle control apparatus of claim 18, wherein the instructions configure the processor to cause the vehicle control apparatus to determine the predicted turn radius further based on Ackermann geometry.

20. The vehicle control apparatus of claim 18, wherein the instructions configure the processor to further cause the vehicle control apparatus to:

identify a false obstacle based on at least one of:

a height of the obstacle being less than a first reference value, or a length of the obstacle being less than a second reference value.

* * * * *